`US009008196B2`

(12) United States Patent
Angelotti et al.

(10) Patent No.: US 9,008,196 B2
(45) Date of Patent: Apr. 14, 2015

(54) UPDATING INTERFACE SETTINGS FOR AN INTERFACE

(75) Inventors: Frank W. Angelotti, Rochester, MN (US); Michael D. Campbell, Poughkeepsie, NY (US); Kenneth L. Christian, Poughkeepsie, NY (US); Martin Eckert, Boeblingen (DE); Hubert Harrer, Boeblingen (DE); Rohan Jones, Poughkeepsie, NY (US); Neil A. Malek, Essex Junction, VT (US); Gary A. Peterson, Rochester, MN (US); Andrew A. Turner, Essex Junction, VT (US); Dermot Weldon, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 13/456,277

(22) Filed: Apr. 26, 2012

(65) Prior Publication Data

US 2012/0278519 A1 Nov. 1, 2012

(30) Foreign Application Priority Data

Apr. 28, 2011 (EP) .................................... 11164095

(51) Int. Cl.
*H04L 27/00* (2006.01)
*G06F 13/10* (2006.01)
*G06F 13/00* (2006.01)

(52) U.S. Cl.
CPC .................................... *G06F 13/102* (2013.01)

(58) Field of Classification Search
CPC ................. H04L 25/03885; G11C 2207/2254; G06F 13/1689
USPC .......... 713/401, 503; 375/220, 232, 234, 252, 375/257, 259, 317, 355, 260, 375; 714/731, 714/775
See application file for complete search history.

(56) References Cited

U.S. PATENT DOCUMENTS 6,101,612 A * 8/2000 Jeddeloh ....................... 713/401
6,414,903 B1 * 7/2002 Keeth et al. ............. 365/189.05
(Continued)

FOREIGN PATENT DOCUMENTS

EP 1423923 B1 5/2005

OTHER PUBLICATIONS

Kim, Byungsub, "Equalized On-Chip Interconnect: Modeling, Analysis, and Design," Massachusetts Institute of Technology, Feb. 2010, pp. 1-118.

*Primary Examiner* — Brian Misiura
(74) *Attorney, Agent, or Firm* — Steven Chiu, Esq.; Blanche E. Schiller, Esq.; Heslin Rothenberg Farley & Mesiti P.C.

(57) ABSTRACT

A computer system includes a processor, and the processor includes at least one interface for communicating with an electronic component. Each of the at least one interface has a set of interface settings. The computer system further includes a memory containing machine executable instructions. Execution of the instructions causes the processor to: monitor communications traffic on the at least one interface; store, eye distribution data acquired during the monitoring of the communications traffic in a database; compare the eye distribution data to a set of predetermined criteria; and generate a set of updated interface settings if the eye distribution does not satisfy the set of predetermined criteria.

20 Claims, 7 Drawing Sheets

(56) References Cited

U.S. PATENT DOCUMENTS

| | | | |
|---|---|---|---|
| 6,430,696 B1* | 8/2002 | Keeth | 713/503 |
| 6,570,406 B2* | 5/2003 | Tang et al. | 326/86 |
| 6,717,439 B2* | 4/2004 | Ohkubo | 326/86 |
| 6,731,683 B1* | 5/2004 | Fiedler et al. | 375/232 |
| 6,735,543 B2* | 5/2004 | Douskey et al. | 702/120 |
| 6,748,338 B2* | 6/2004 | Cheng | 702/108 |
| 6,794,900 B2* | 9/2004 | Tang et al. | 326/86 |
| 6,806,877 B2* | 10/2004 | Fernando | 345/440 |
| 6,909,315 B2* | 6/2005 | Carnevale et al. | 327/261 |
| 6,950,956 B2* | 9/2005 | Zerbe et al. | 713/400 |
| 7,062,625 B1* | 6/2006 | Shrader et al. | 711/167 |
| 7,103,512 B2* | 9/2006 | Julicher et al. | 702/188 |
| 7,165,185 B2* | 1/2007 | Li et al. | 713/500 |
| 7,168,027 B2* | 1/2007 | Lee et al. | 714/775 |
| 7,295,618 B2* | 11/2007 | Hsu et al. | 375/257 |
| 7,339,985 B2* | 3/2008 | Rao | 375/226 |
| 7,352,815 B2* | 4/2008 | Camara et al. | 375/257 |
| 7,403,584 B2* | 7/2008 | Koenenkamp | 375/371 |
| 7,418,068 B2* | 8/2008 | Barrett et al. | 375/355 |
| 7,489,738 B2* | 2/2009 | Tanabe | 375/295 |
| 7,512,854 B2* | 3/2009 | Aldereguia et al. | 714/731 |
| 7,627,463 B2* | 12/2009 | Chidhambarakrishnan | 703/14 |
| 7,656,181 B2* | 2/2010 | Kim et al. | 324/762.02 |
| 7,660,350 B2* | 2/2010 | Hsu et al. | 375/226 |
| 7,703,063 B2* | 4/2010 | Hovis et al. | 716/122 |
| 7,715,323 B2* | 5/2010 | Connolly et al. | 370/252 |
| 7,733,964 B2* | 6/2010 | Hsu et al. | 375/257 |
| 7,733,967 B2* | 6/2010 | Yamazaki | 375/260 |
| 7,787,536 B2* | 8/2010 | Chou | 375/232 |
| 7,869,379 B2* | 1/2011 | Connolly et al. | 370/252 |
| 7,970,087 B2* | 6/2011 | Millman | 375/355 |
| 8,108,738 B2* | 1/2012 | Gara et al. | 714/700 |
| 8,254,472 B2* | 8/2012 | Morita et al. | 375/259 |
| 8,396,106 B2* | 3/2013 | Connolly et al. | 375/232 |
| 8,396,109 B2* | 3/2013 | Farjad-rad | 375/232 |
| 8,649,686 B1* | 2/2014 | Booth | 398/162 |
| 8,681,839 B2* | 3/2014 | Bulzacchelli et al. | 375/220 |
| 8,699,585 B2* | 4/2014 | Okamura | 375/257 |
| 2002/0176518 A1* | 11/2002 | Xu | 375/317 |
| 2003/0043900 A1* | 3/2003 | Deas et al. | 375/234 |
| 2005/0001662 A1* | 1/2005 | Kizer et al. | 327/156 |
| 2008/0094107 A1* | 4/2008 | Dallaire et al. | 327/63 |
| 2008/0137721 A1 | 6/2008 | Hsu et al. | |
| 2009/0168859 A1 | 7/2009 | Tsubamoto et al. | 375/224 |

\* cited by examiner

Fig. 8

UPDATING INTERFACE SETTINGS FOR AN INTERFACE

PRIOR FOREIGN APPLICATION

This application claims priority from European patent application number 11164095.9, filed Apr. 28, 2011, which is hereby incorporated herein by reference in its entirety.

BACKGROUND

One or more aspects of the invention relate to computer interfaces, and in particular to the generation of a set of updated interface settings for an interface between a processor and an electronic component.

Real Time Eye Measurements inside a system is one step in high speed interfaces, for example an elastic interface, and reliable connections in high end server designs. Initial interface parameter settings are based on or learned from a subset of hardware distribution.

It becomes difficult to predict future process variation and tolerances in silicon performance and wiring. Defining a common set of parameters valid for entire hardware distribution becomes more and more difficult.

BRIEF SUMMARY

Aspects of the invention provide for a computer system, a computer-readable storage medium and a method in the independent claims. Embodiments are given in the dependent claims.

In one aspect, a computer system is provided. The computer system includes, for instance, a memory containing machine executable instructions for execution by the processor; and a processor, wherein the processor comprises at least one interface for communicating with an electronic component, wherein the at least one interface has a set of interface settings, wherein the computer system is configured to perform a method, the method including: monitoring communications traffic on the at least one interface; storing eye distribution data acquired during the monitoring of the communications traffic in a database; comparing the eye distribution data to a set of predetermined criteria; and generating a set of updated interface settings based on the eye distribution not satisfying the set of predetermined criteria.

BRIEF DESCRIPTION OF THE SEVERAL VIEWS OF THE DRAWINGS

In the following, embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

Figure 1:
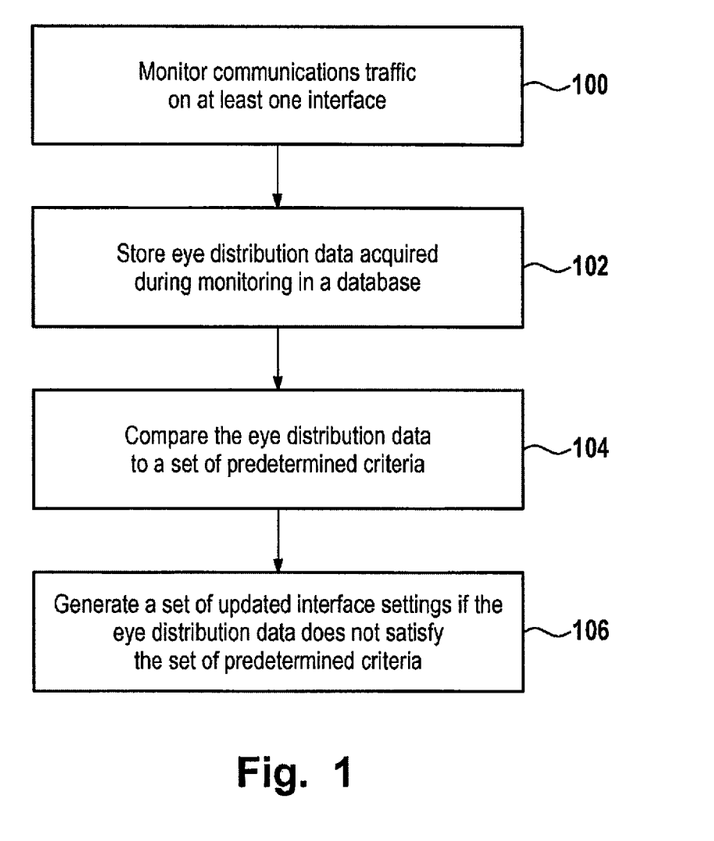
FIG. 1 shows a flow diagram which illustrates a method according to an embodiment of the invention.

FIG. 1 shows a flow diagram which illustrates a method according to an embodiment of the invention. In step 100 communications traffic is monitored on at least one interface. In step 102 eye distribution data acquired during the monitoring is stored in a database. In step 104 the eye distribution data is compared to a set of predetermined criteria. This step may include querying the database or retrieving data from the database. In some embodiments this may also include constructing an eye diagram or figure using the eye distribution data. Finally in step 106 a set of updated interface settings is generated if the eye distribution data does not satisfy the set of predetermined criteria.

Figure 2:
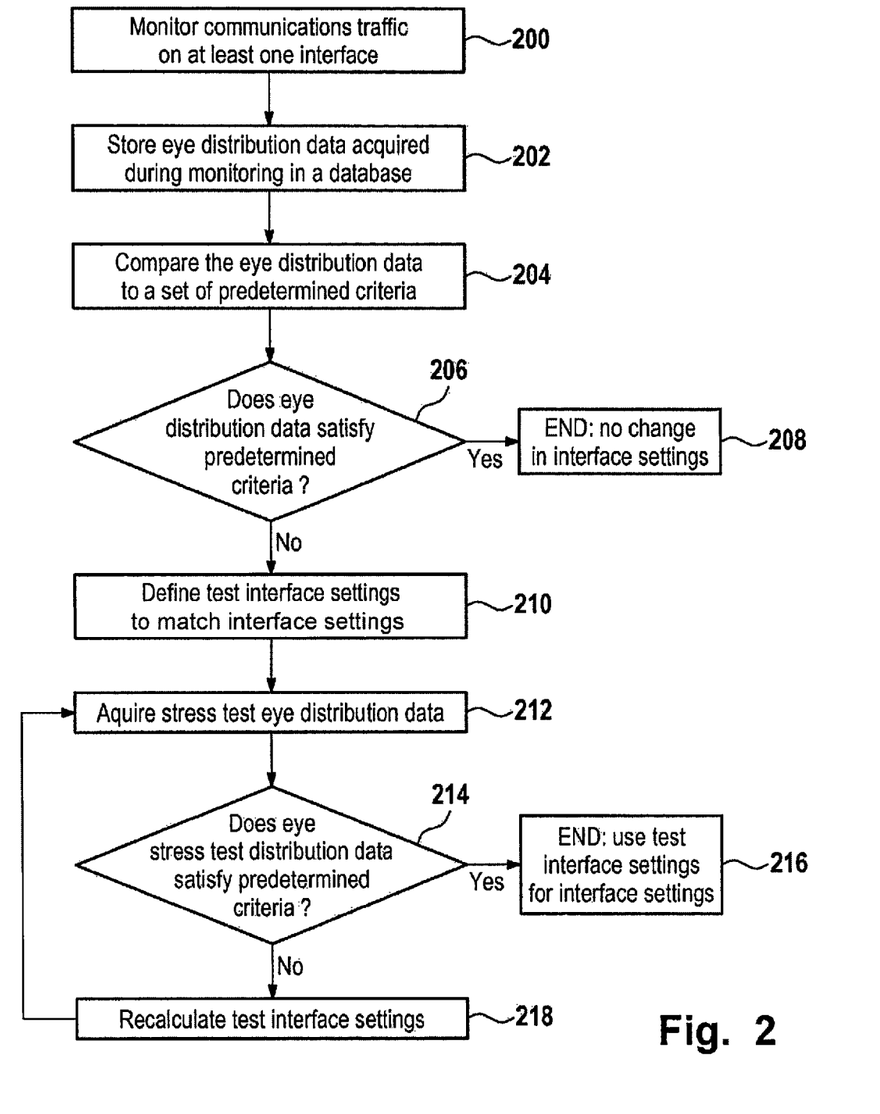
FIG. 2 shows a flow diagram which illustrates a method according to a further embodiment of the invention.

FIG. 2 shows a flow diagram which illustrates a method according to a further embodiment of the invention. In step 200 communications traffic is monitored on at least one interface. Next in step 202 eye distribution data acquired during the monitoring is stored in a database. Next in step 204 the eye distribution data is compared to a set of predetermined criteria. Step 206 is a decision box. The question in step 206 is does eye distribution data satisfy predetermined criteria. If the answer is yes then the method ends in block 208. There is no change in the interface settings. If the eye distribution data does not satisfy the predetermined criteria then block 210 is performed. In step 210 a set of test interface settings are set to match the interface settings. In step 212 stress test eye distribution data is acquired. Stress test eye distribution data as used herein encompasses eye distribution data that is acquired during a stress test. This may be performed using the same interface or an interface which is configured to match that of the interface which acquired the original eye distribution data. There is another question box in step 214. The question is does the eye stress test distribution data satisfy the predetermined criteria. If this is yes then the method ends and the test interface settings are used for the interface settings. If the answer is no then the test interface settings are recalculated in step 218. The method then returns to block 212 and stress test eye distribution data is acquired for the recalculated test interface settings. The method repeats itself until the eye stress test distribution data does actually satisfy the predetermined criteria.

Figure 3:
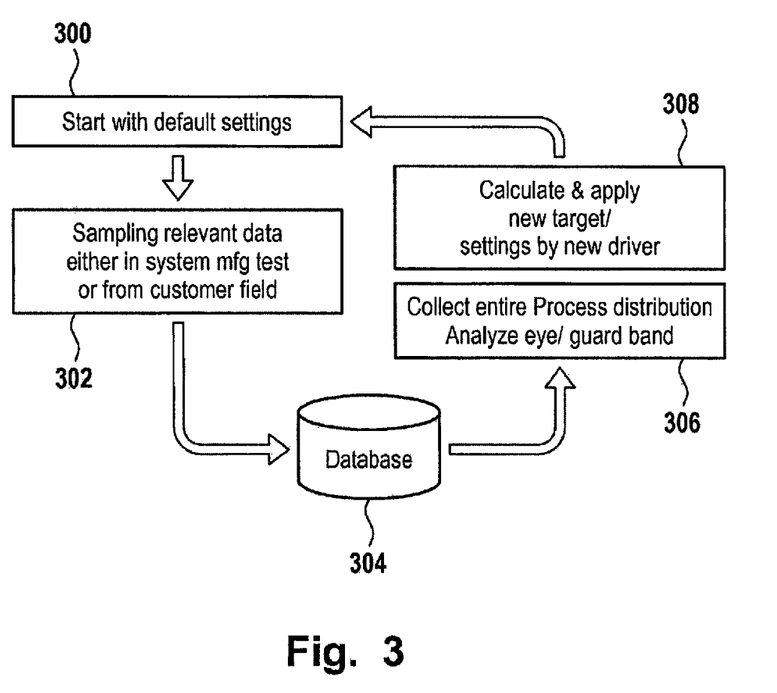
FIG. 3 shows a flow diagram which illustrates a method according to a further embodiment of the invention.

FIG. 3 shows a flow diagram which illustrates the method according to a further embodiment of the invention. In step 300 the method starts with using the default interface settings. Next in step 302 relevant data is sampled either in a system manufacturing test or from a machine that has been installed at a customer site in the field. In step 304 the sampled data is stored into a database 304. Next in step 306 the data is collected and analyzed using the eye distribution data and/or guard band data. Next in step 308 new settings are calculated and applied to a new target and/or the interface settings are replaced with those that have just been calculated. In some embodiments the default settings are replaced with the new settings.

Figure 4:
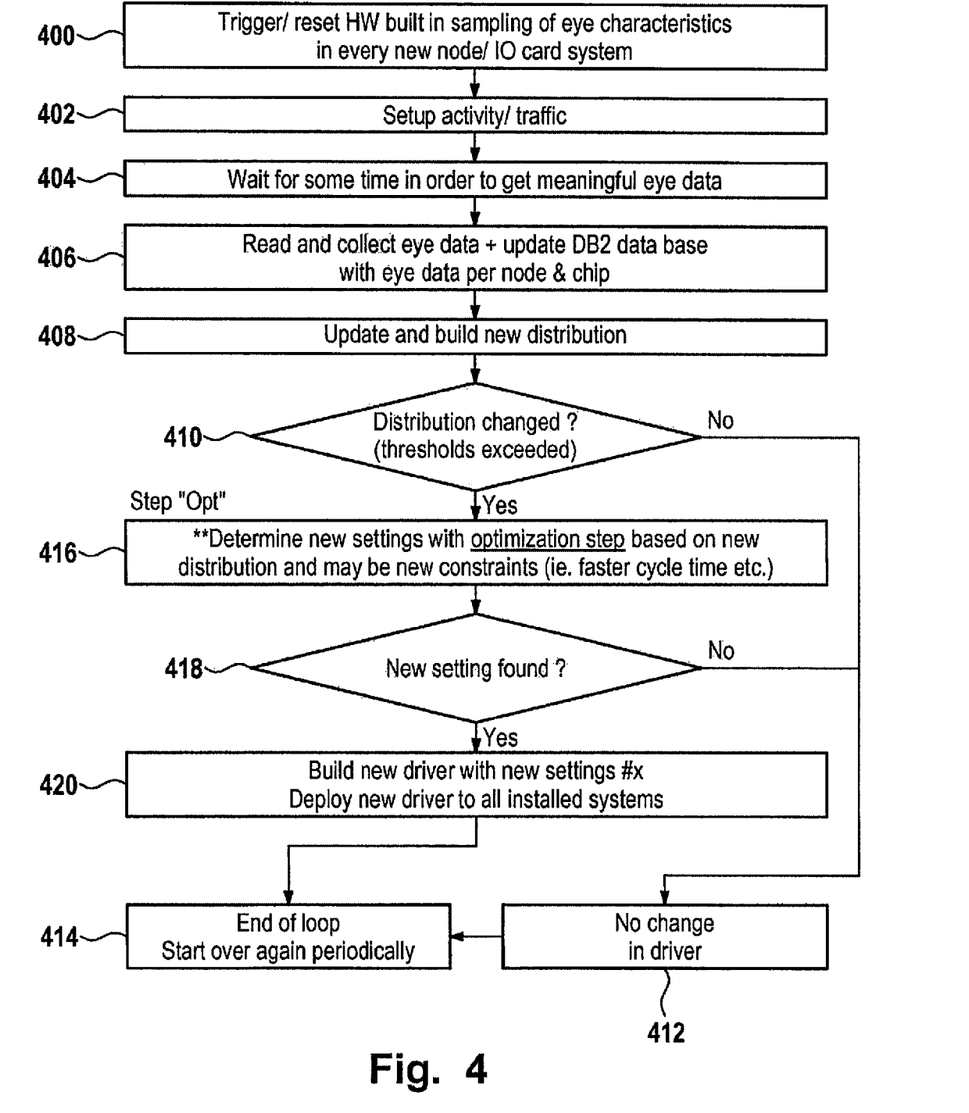
FIG. 4 shows a flow diagram which illustrates a method according to a further embodiment of the invention.
Figure 5:
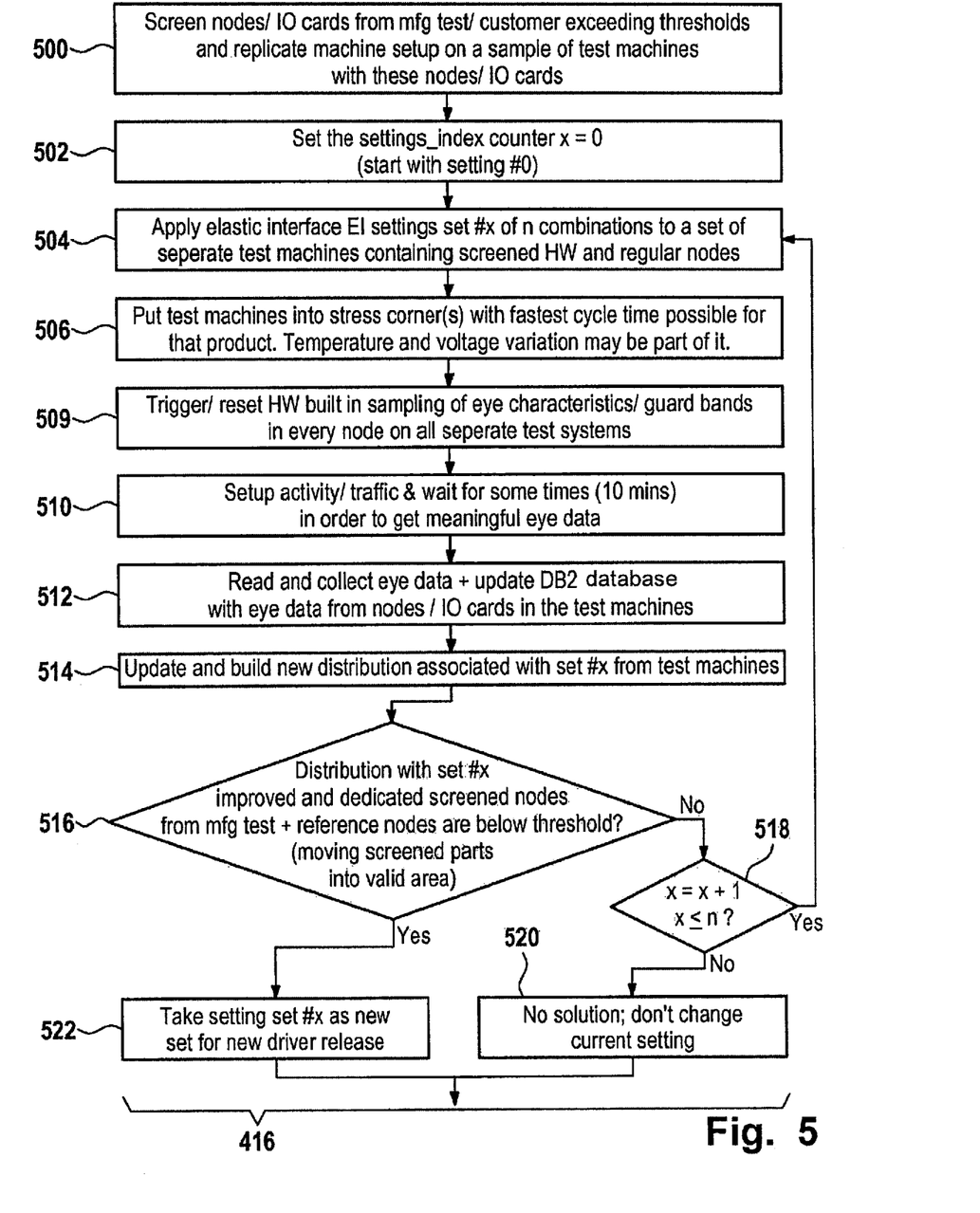
FIG. 5 illustrates an embodiment of the optimization step of the embodiment shown in FIG. 4.

One embodiment of the invention may be described using FIGS. 3, 4, and 5. This embodiment may have the following features:

1) A circuitry adapted for periodically determining eye opening and guard bands.

2) A SW reading these values for a complete set of parts. (increasing number of parts over time) since last driver update (cf. FIG. 3).

3) A method transforming this into a format which can be parsed for DB2 or other database format import.

4) Generating a chart showing distribution of eye characteristics, i.e., eye opening or guard band (horizontal eye: time steps left and right of sampling point to data bit edge).

5) Screening out parts which violate rules applied to distribution, i.e., cut off distribution for parts with less than a predefined amount of guard band.

6) A software sequence to determine a set of parameters which brings back screened parts into desired distribution range, cf. FIG. 5. In some instances the distribution may have changed due to new components supplier, leading to distribution changes and/or guard band violations which were unforeseen during development time.

7) Applying these new parameters to screened parts and potential reference parts inside IBM to prove effectiveness and deploy a new driver level to all machines inside and/or outside IBM, cf. FIGS. 3 and 4.

8) Do steps 1-7 for every bus type in a system. It might be the case that only 1 or 2 or all bus types need parameter update.

9) There could be the case that even with a parameter optimization step there is no better solution found. This is then a sign of a yield detractor. The new hardware leading to this situation has either a) components in it which are worse than allowed from an electrical point of view or b) stress conditions have been changed in a way that hardware cannot fulfill robustness and/or sufficient guard banding as originally required.

FIG. 4 shows a flow diagram which illustrates a method according to a further embodiment of the invention. In step 400 the trigger and/or reset hardware built into sampling of eye characteristics in every new node or processor and/or IO card in a computer system. A node or processor may also have an interface, such as an elastic interface directly to a memory. The memory may be main memory. This may for instance be performed within a controlled test situation or it may be done at a customer installation. Next in step 402 setup activity and/or traffic on an interface is monitored. Next in step 404 the eye distribution data is collected for a period of time. Next in step 406 the eye distribution data is read and collected. A database is updated with eye data specified by node and processor chip. Next in step 408 a new distribution is built. This distribution may be for instance an eye diagram or chart. Next in step 410 the distribution is examined to see if it exceeds a set of predetermined thresholds or criteria. If the predetermined criteria are not exceeded then there is no change in the driver and step 412 is performed. In step 414 the method ends, however it may be repeated periodically. If the distribution is exceeded then step 416 is performed. In step 416 new settings are determined within optimization step based on a newly acquired distribution of eye distribution data. There may also be constraints added during the optimization step. For instance a faster cycle time may be used. Next step 418 is performed. This is a decision box and it is decided whether new settings are found. If new settings are not found then block 412 is performed again and there is no change in the driver. If new settings are found then block 420 is performed. A new driver is built for the computer system which contains the new interface settings. The new driver is then deployed to all systems which use this hardware configuration. After step 420 the method ends in block 414, however the method may be restarted again periodically.

FIG. 5 illustrates block 416 of FIG. 4 in more detail. FIG. 5 explains how to perform the optimization step 416. In FIG. 5 the first step performed is step number 500. In step 500 nodes and/or IO cards are screened during a manufacturing test and/or customer test to see if they replicate the machine setup on a sample of test machines with these nodes and/or IO cards. Eventually in step 500 the setup is replicated. This step in some embodiments may be performed manually. Next in step 502 an index counter is set to zero. In step 504 interface settings of end combinations are applied to a set of separate test machines containing screened hardware and regular nodes. Next in step 506 test machines are placed into a stress quarter with specific, ie. the fastest, the slowest, or other, cycle times possible for that particular machine. Temperature and voltage variation of the machine may be performed during this step. Next in step 508 the triggering and reset of hardware in sampling of eye characteristics and/or guard bands is performed in every node on all separate test systems. Next in step 510 activity and/or traffic is transmitted on the interface and is recorded for a period of time in order to get meaningful eye distribution data. In step 512 the eye distribution data is read and collected. A database is then updated with the eye data from the nodes and/or IO cards in the test machines. Next in step 514 the new distributions are updated and built associated with the set of test machines. Step 516 is a decision box. The distribution is tested to see if it meets the predetermined criteria. If it does not meet the predetermined criteria then block 518 is performed. In block 518 a check is performed to see if a maximum number of iterations have been performed. If the maximum number of iterations has been performed then block 520 is performed and the settings are not changed. If the maximum number of iterations has not been performed then the loop restarts by going to block number 504 and the machine is tested with a new set of interface settings. If however in block 516 the predetermined criteria are satisfied then block 522 is performed and the current set of interface settings is used. After performing block 522 or 520 the method returns to block 418 in FIG. 4.

Figure 6:
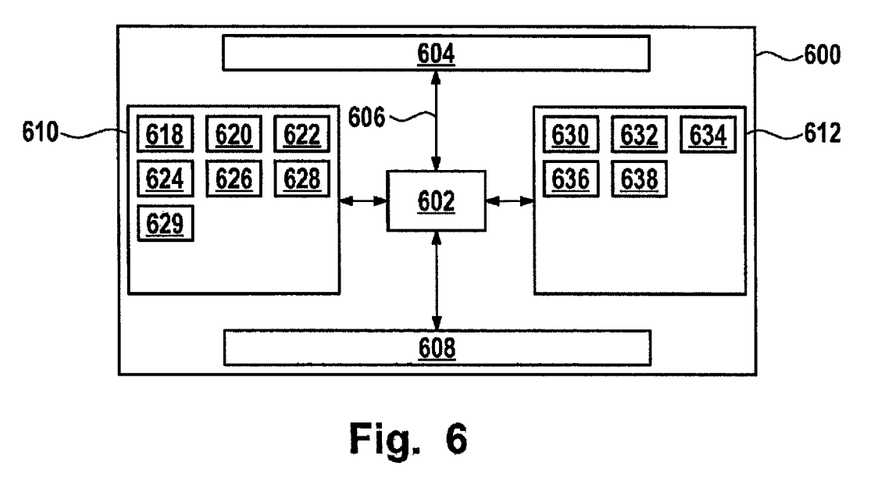
FIG. 6 illustrates a computer system according to an embodiment of the invention.

FIG. 6 illustrates a computer system 600 according to an embodiment of the invention. In this computer system there is a processor 602 which is connected to an electronic component 604 by an interface 606. The processor 602 is further connected to a network interface 608, computer storage 610, and computer memory 612. The computer storage 610 is shown as containing a database 618 containing eye distribution data acquired by the processor 602 while monitoring the interface 606. The computer storage 610 is further shown as containing a set of predetermined criteria 620. The computer storage 610 is further shown as containing interface settings 622. The interface settings 622 are the settings which control the operation and function of the interface 606. In some embodiments the interface settings 622 may be stored in specialized hardware belonging to the interface 606. The computer storage 610 is further shown as containing a set of updated interface settings 624. The computer storage 610 is further shown as containing a hardware configuration 626 which is descriptive of the electronic component 604. The computer storage 610 is further shown as containing an eye diagram 628 which has been constructed from the eye distribution data within the database 618. The computer storage 610 is further shown as containing a driver 629 which is a hardware driver for the interface 606. The driver 629 may for instance have been constructed using the updated interface settings 624.

The computer memory 612 is shown as containing computer executable code for execution by the processor 602. Within the computer memory there is a test module 630. The test module comprises computer executable code for controlling the execution and performing an embodiment of a method according to an aspect of the invention. The computer storage 612 is further shown as containing an eye diagram construction module 632. The eye diagram construction module 632 contains computer executable code which is able to access the database 618 and construct the eye diagram 628. The computer memory 612 is shown as further containing a comparison module 634. The comparison module 634 is adapted for comparing the eye diagram 628 with a predetermined criterion 620. The computer memory 612 is further shown as containing an interface setting generation module 636. The interface setting generation module 636 was used to generate the updated interface settings 624. For instance the interface setting generation module 636 may follow the method shown in FIGS. 4 and 5. The computer memory 612 is further shown as containing a driver compiler module 638. The driver compiler module 638 contains computer executable code for turning the updated interface settings 624 into a driver 629. The driver 629 may then be distributed to the interface 606.

Figure 7:
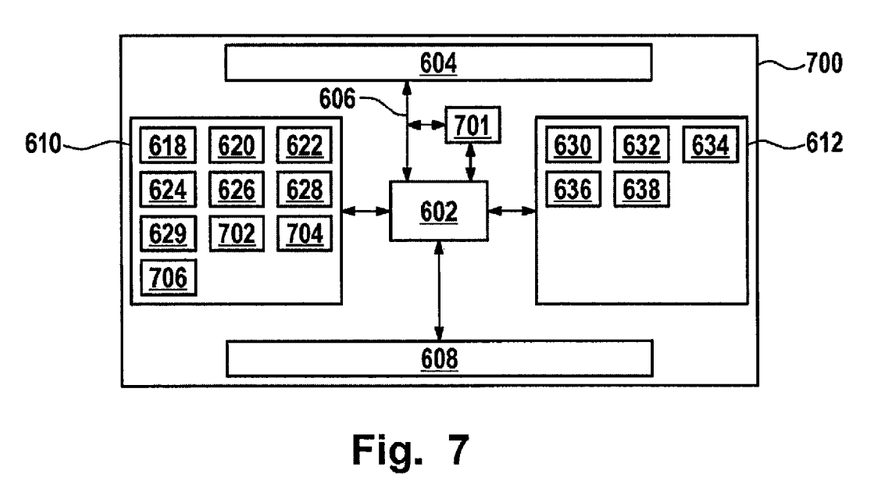
FIG. 7 illustrates a computer system according to an embodiment of the invention.

FIG. 7 illustrates a computer system 700 according to a further embodiment of the invention. The computer system 700 shown in FIG. 7 is essentially equivalent to the computer system 600 shown in FIG. 6. The computer system in FIG. 7 however has an interface monitoring hardware 701 which monitors the interface 606. The interface monitoring hardware 701 acquires data for the database 618. The computer storage 610 is further shown as containing test interface settings 702, stress test eye distribution data 704, and a stress test eye diagram 706. The test interface settings 702 are used as settings 606 for the interface during a stress test. The stress test eye distribution data 704 is the eye distribution data acquired during the stress test. The eye diagram construction module 632 may be used to construct the stress test eye diagram 706 using the stress test eye distribution data 704.

Figure 8:
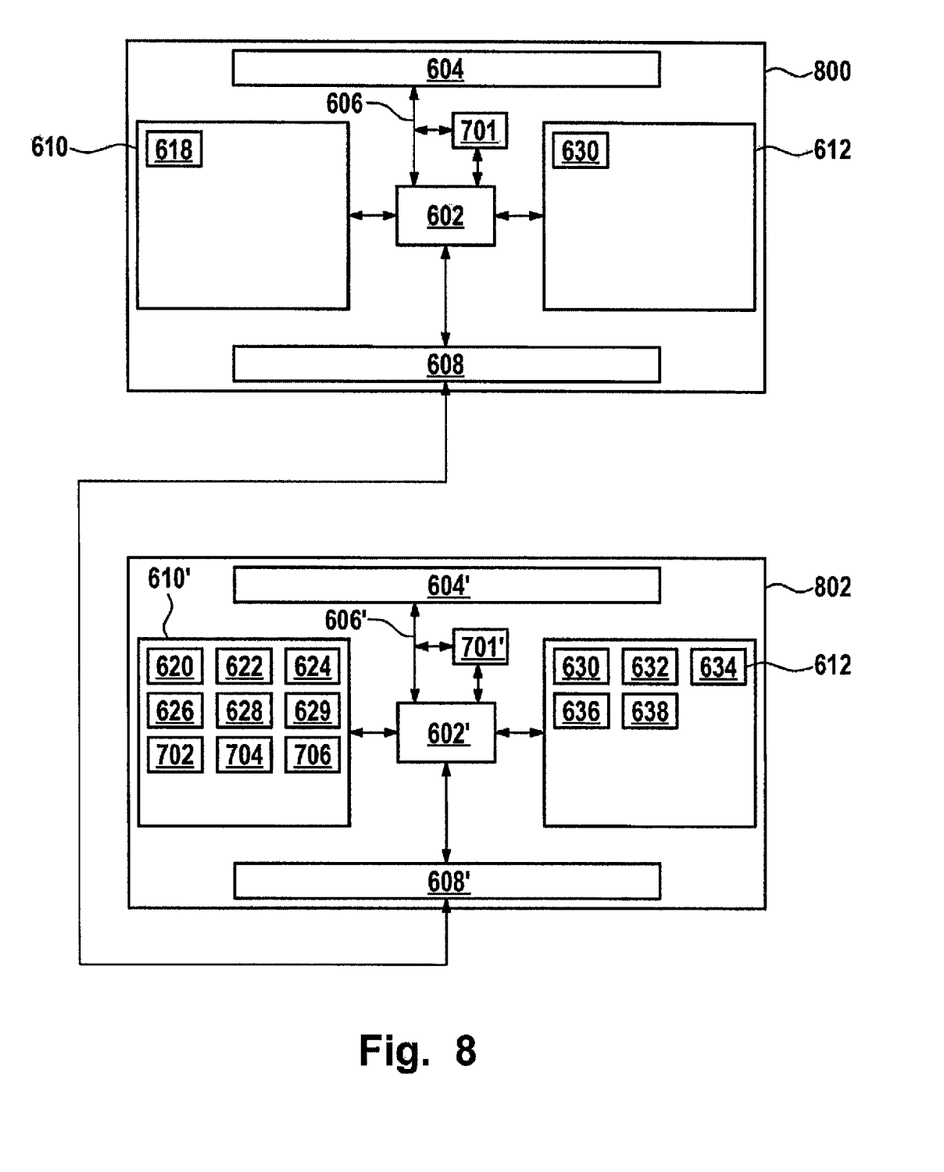
FIG. 8 illustrates a computer system according to a further embodiment of the invention.

FIG. 8 shows two computer systems 800 and 802. In FIG. 8 the functionality of the computer system shown in FIG. 7 700 is split amongst the two separate computer systems. The computer system 800 only acquires the eye distribution data and deposits it in the database 618. Computer system 802 replicates or uses equivalent hardware. The primed numbers shown in FIG. 8 have equivalent function to the unprimed numbers shown in FIG. 8. For example the processor 602 is equivalent to the processor 602'. The computer system 802 may be able to access the database 618 via the network interfaces 608, 608' and compare the eye distribution data to the predetermined criteria 620 which are now in the computer storage 610' of computer 802. The computer system 802 can then run its stress test using the interface 606' while it is being monitored by the interface monitoring hardware 701'. The advantage in this situation is that the computer system 800 can continue to perform and operate normally while the updated interface settings 624 are determined. Also the computer system 802 is representative. There may actually be a collection of computer systems each running stress tests simultaneously.

VLSI processors with high speed interfaces require accurate settings of driver and receiver settings. Embodiments of the invention may identify process distribution from manufacturing test and from customer field in a real system. A secondary adjustment loop will address the question on these future process tolerances and range of distribution.

Currently, settings for an interface may be empirically determined using a sample of chips or may be determined for individual settings for each of the point to point links. These techniques may have the disadvantages that:

1) Not covering for entire distribution may result in some parts failing later. This is because the real computer system was not studied to determine the interface settings.

This may also cause the problem that higher error margins are required to prevent failure of the interface.

2) Requires code overhead to support, this support may be difficult in different customer environments.

Embodiments of the invention may solve these and other problems by applying a technique in which hardware elements and software are provided to quantify eye opening and guard bands per data bit or per bus in system nodes and/or between nodes. In some embodiments the interface is an Elastic Interface (EI). The invention may further comprise a methodology to quantify complete distribution range of hardware; for example nodes, IO cards, and buses; and calculating and/or adjusting improved target settings.

Embodiments of the invention may have the following advantages:

Being able to improve the interface settings for a target system.

Staying with one set of settings in code.

Covering for complete hardware distribution.

Open for future process changes, tolerances, and/or variations.

Open for new cards attached to interfaces not available when shipping nodes the first time.

Getting feedback from each node under test or at customer location.

Other adjustments may be performed, i.e. optimizing system for speed.

Helps Decision-Making-Process for Implementation of a guard-band and/or cutting into the hardware distribution.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' is an example of a computer-readable storage medium. Computer memory is any memory which is directly accessible to a processor. Examples of computer memory include, but are not limited to: RAM memory, registers, and register files. References to 'computer memory' or 'memory' should be interpreted as possibly being multiple memories. The memory may for instance be multiple memories within the same computer system. the memory may also be multiple memories distributed amongst multiple computer systems or computing devices.

'Computer storage' or 'storage' is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa. References to 'computer storage' or 'storage' should be interpreted as possibly being multiple storage devices. The storage may for instance be multiple storage devices within the same computer system or computing device. The storage may also be multiple storages distributed amongst multiple computer systems or computing devices.

A 'computer system' as used herein encompasses any device comprising a processor. A 'processor' as used herein encompasses an electronic component which is able to execute a program or machine executable instruction. References to the computer system comprising "a processor" should be interpreted as possibly containing more than one processor or processing core. The processor may for instance be a multi-core processor. A processor may also refer to a collection of processors within a single computer system or distributed amongst multiple computer systems. The term computer system should also be interpreted to possibly refer to a collection or network of computer systems each comprising a processor or processors. Many programs have their instructions performed by multiple processors that may be within the same computer system or which may even be distributed across multiple computer systems.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'database' as used herein encompasses a data file or repository which contains data that may be accessed by a processor. Examples of databases are, but are not limited to: a data file, a relational database, a file system folder containing data files, and a spreadsheet file.

In one aspect the invention provides for a computer system comprising a processor. The processor comprises at least one interface for communicating with an electronic component. The electronic component may be a component of the computer system. For instance the electronic component may be a networking card or interface, a display interface, a service interface, a peripheral unit, a memory management unit; it may be a computer memory, computer storage, or another processor. Each of the at least one interfaces has a set of interface settings. The interface settings as used herein refer to settings which configure the use of the interface. Modern processors run at extremely high clock cycles. The interfaces which they are connected to may or may not be able to transmit data at such a high clock cycle. The actual quality of the interface may depend upon the physical characteristics such as the wiring or wiring path and also the component to which it is connected. Therefore it is usually beneficial to have a set of interface settings which configure the operation of the interface such that it is able to transmit and receive data with a minimal number of errors.

The computer system further comprises a memory containing machine executable instructions for execution by the processor. Execution of the instructions causes the processor to monitor communication traffic on the at least one interface. During the monitoring of the communications traffic data descriptive of the communications traffic may be acquired. For instance data which may be used to construct an eye pattern herein referred to as eye distribution data may be stored. An eye pattern or an eye diagram is an oscilloscopic display in which a digital data signal from a receiver is sampled and then applied on the vertical input. The data rate is used to sweep the horizontal rate. It is called an eye pattern or diagram because the data may appear as a series of eyes between a pair of rails. Eye diagrams or patterns are useful for diagnosing if a communication channel has signals which are too long or short, it is also useful for identifying poorly synchronized signals and also if the binary level is too high or too low. If the eye pattern has a so called open eye pattern then the signal has minimal signal distortion. Interference causes the eye diagram to have a closed eye appearance.

Execution of the instructions further cause the processor to store eye distribution data acquired during the monitoring of the communication traffic in a database. The eye distribution data may for instance be acquired for a predetermined period of time. In another embodiment the stress test eye distribution data is acquired when a predetermined type of communications traffic is detected on the interface. Execution of the instructions further causes the processor to compare the eye distribution data to a set of predetermined criteria. This comparison may be performed by comparing the data directly with the criteria or it may be performed in an intermediate step of constructing an eye diagram or eye pattern.

There are a number of measurements that may been taken from the eye diagram and used for comparison to a criteria. For instance there may be measurements related to the amplitude. These may include, but are not limited to: eye amplitude, eye crossing amplitude, eye crossing percentage, eye height, eye level, eye signal-to-noise ratio, quality factor, and vertical eye opening. There are also a number of measurements from an eye diagram relating to time measurements. These include, but are not limited to: deterministic jitter, eye crossing time, eye delay, eye fall time, eye rise time, eye width, horizontal eye opening, peak-to-peak jitter, random jitter, mean square jitter, and total jitter. In addition the eye pattern or diagram can be compared to an outline of the distribution. Such an outline may also be considered to be a predetermined criteria.

Execution of the instructions further causes the processor to generate a set of updated interface settings if the eye distribution does not satisfy the set of predetermined criteria.

One or more of the embodiments may be beneficial in several different situations. It is understood here that references to a processor may in fact refer to multiple processors. Likewise references to a computer system may refer to multiple computer systems. For instance the monitoring communications traffic may be performed on one computer system and additional computer systems may be used for comparing the eye distribution data to the set of predetermined criteria and also to generate the set of updated interface settings. For instance a computer system in use at a customer site may log the eye distribution data and this is then later examined by a computer system at a different site. The generation of the updated interface settings in this case may include replicating the configuration of the computer system which logged the eye distribution data.

In another embodiment the computer system monitors the communications traffic, compares the eye distribution, and also generates a set of updated interface settings. Both of these embodiments perform an improved means for generating interface settings for optimizing the communication of a processor with electronic component over an interface. An interface as used herein encompasses an additional communication channel for communication between a processor and an electronic component.

In another embodiment execution of the instructions further causes the processor to repeatedly retrieve the eye distribution data from the database. Execution of the instructions further causes the processor to repeatedly define a set of test interface settings of a test interface to match the set of interface settings. Execution of the instructions further causes the processor to repeatedly acquire stress test eye distribution data from the test interface. The stress test eye distribution data may for instance be acquired for a second predetermined period of time. In another embodiment the stress test eye distribution data is acquired when a predetermined type of communications traffic is detected.

Execution of the instructions further causes the processor to repeatedly compare the stress test eye distribution data to the set of predetermined criteria. Execution of the instructions further causes the processor to recalculate the set of test interface settings if the stress test eye distribution data satisfies the set of predetermined criteria. Execution of the instructions further causes the processor to repeatedly use the set of test interface settings as the set of updated interface settings if the test eye distribution satisfies the set of predetermined criteria. This embodiment is beneficial because it describes an iterative process where interface settings are determined empirically.

Initially the test interface settings used to acquire the original eye distribution data are used. These are then checked to see if they meet the set of predetermined criteria. Next if they do not satisfy the criteria a new set of test interface settings are recalculated and used to test again. This is repeated until a set of test interface settings are determined which meet the set of predetermined criteria. This is a particularly beneficial way of generating interface settings using data at a customer site. During the development of a computer system it may not be possible to simulate every conceivable way or hardware configuration that may be used at a customer site. This technique provides for an effective means of developing interface settings.

In another embodiment the test interface is the interface. This embodiment is beneficial because the computer system is able to generate its own set of updated interface settings.

In another embodiment the test interface is on at least one remote computer system. This embodiment is beneficial because the test interface is used to replicate the interface. This may be beneficial when it is desirable to generate a set of updated interface settings without disturbing the operation and function of the original interface.

In another embodiment execution of the instructions causes the processor to replicate multiple examples of the test interface. The multiple examples of the test interface are used during acquisition of the stress test data. This embodiment is advantageous because by using multiple test interfaces the stress test eye distribution data can be acquired extremely rapidly. This may lead to a more rapid determination of the new interface settings and also a more robust determination of the interface settings.

In another embodiment the database stores eye distribution data acquired from the multiple computer systems. The eye distribution data from multiple computer systems is used to compare to the set of predetermined criteria. Multiple examples of a computer system may be configured identically and have similar communications traffic. By combining this data into a single database a more complete eye distribution may be constructed which may be used to generate better updated interface settings.

In another embodiment execution of the instructions cause the processor to replace the interface settings with the updated interface settings. This is beneficial because the updated interface settings may provide for a more effective and efficient operation of the interface.

In another embodiment execution of the instructions causes the processor to distribute the updated settings to other computer systems. This may be beneficial because interface settings which provide for a more efficient and reduced error of operation may be propagated to other computer systems.

In another embodiment execution of the instructions further cause the processor to determine a hardware configuration of the computer system. The updated settings are distributed with the hardware configuration. This embodiment is advantageous because different interface settings may be beneficial to use with different hardware configurations. If the updated settings are distributed with the hardware configuration then a computer system can choose the settings for the interface which are optimized for a particular hardware configuration.

In another embodiment there are multiple interfaces. This embodiment may be beneficial because a natural computer system may have more than one interface which is in use at any given time.

In another embodiment execution of the instructions cause the processor to detect a hardware change of the computer system using the comparison between the eye distribution data and the set of predetermined criteria. The set of updated interface settings is generated in accordance with the hardware change. Changing the hardware or more specifically the electronic component may cause a change in the quality of the transmission of data along the interface. This may be detectable by comparing the eye distribution data to the set of predetermined criteria. For instance the eye may become more closed because of an increased amount of noise on the interface. This may be beneficial in some embodiments because by detecting a hardware change a more accurate set of interface settings may be generated. For instance if a change in hardware is detected and interface settings selected for this or more general hardware may be selected.

In another embodiment the communications traffic is monitored for a predetermined time. This embodiment may be beneficial because it may be used to ensure a general level of quality of the interface for a specified period of time.

In another embodiment execution of the instructions causes the processor to monitor communications traffic when a predetermined traffic criterion is satisfied; for instance if the interface is not in use or if the type of traffic is not very demanding on the interface then it may not be useful to acquire the eye distribution data. This embodiment may be beneficial because it may be used to assure the quality of the connection when a predetermined type of traffic is being transmitted on the interface.

In another embodiment, the interface is any one of the following: an elastic interface bus, a high speed bus, elastic interface, FireWire, USB SATA, eSATA Mainframe I/O channel, Infiniband, ExpressCard, PCI, PCI-X, and PCI Express. The aforementioned interfaces are exemplary, embodiments of the invention are not limited to these types of interfaces.

In another embodiment the set of interface settings are updated by selecting a predetermined hardware configuration. This may be beneficial because there may be pre-existing interface settings existing for interface settings. There may also be different interface settings which guarantee different quality of communication between the processor and the electronic component. If one set of interface settings fails to deliver viable communications between the processor and the electronic component a different set of predetermined hardware configuration may be selected.

In another embodiment the settings comprise any one of the following: Interface Alignment Process Sequence Invert, Re-calibration Interval, Disable Recal Wrap, Desired Delay Steps, Auto Receiver Reference Voltage, Alignment Mode, Disable Scrambler, Auto Delay Line Calibration Enable, Clock Duty Cycle, Trim Control, Peaking/Frequency Compensation, Slew, Pre-compensation Enable, Driver Clock Inversion, Driver Low Ohm Mode, Slow Mode, Set Minimum delay Bias, Guard Band Delay Max, Delay Max, Voltage Reference Forwarding, Slow Mode Control, Eye Check Wrap Mode, Interface Alignment Process Legacy mode, Fixed Offset Mode, Target, Master/Slave, and Learned Target Cycle settings.

In another aspect the invention provides for a computer-readable storage medium containing instructions for execution by a processor. The processor comprises at least one interface for communicating with an electronic component. Each of the at least one interfaces has a set of interface settings. Execution of the instructions causes the processor to monitor communications traffic on the at least one interface. Execution of the instructions further causes the processor to store eye distribution data acquired during the monitoring of the communications traffic in a database. Execution of the instructions further causes the processor to compare the eye distribution data to a set of predetermined criteria. Execution of the instructions further causes the processor to generate a set of updated interface settings if the eye distribution does not satisfy the set of predetermined criteria.

In another aspect the invention provides for a method of generating a set of updated interface settings for a computer system comprising a processor. Likewise the invention also provides for a computer-implemented method. The processor comprises at least one interface for communicating with an electronic component. Each of the at least one interfaces has a set of interface settings. The method comprises the step of monitoring communications around the at least one interface. The method further comprises the step of storing eye distribution data acquired during the monitoring of the communications traffic in a database. The method further comprises the step of comparing eye distribution data to a set of predetermined criteria. The method further comprises the step of generating a set of updated interface settings if the eye distribution does not satisfy the set of predetermined criteria. The advantages of this embodiment have been previously discussed.

What is claimed is:

1. A computer system comprising:
    a memory; and
    a processor in communications with the memory, wherein the computer system is configured to perform a method, the method comprising:
        monitoring communications traffic on at least one interface of the processor, the at least one interface to communicate with an electronic component, and wherein the at least one interface has a set of interface settings, the monitoring comprising monitoring the communications traffic for a predetermined time or execution of instructions causes the processor to monitor the communications traffic when a predetermined traffic criterion is satisfied;
        storing eye distribution data acquired during the monitoring of the communications traffic in a database;
        comparing the eye distribution data to a set of predetermined criteria; and
        generating a set of updated interface settings based on the eye distribution not satisfying the set of predetermined criteria.

2. The computer system of claim 1, wherein method further comprises:
    defining a set of test interface settings of a test interface to match the set of interface settings;
    acquiring stress test eye distribution data from the test interface;
    comparing the stress test eye distribution data to the set of predetermined criteria;
    recalculating the set of test interface settings if the stress test eye distribution data does not satisfy the set of predetermined criteria; and
    using the set of test interface settings as the set of updated interface settings if the test eye distribution satisfies the set of predetermined criteria.

3. The computer system of claim 2, wherein the test interface is the interface.

4. The computer system of claim 2, wherein the test interface is on at least one remote computer system.

5. The computer system of claim 4, wherein the method further comprises replicating multiple examples of the test interface, wherein the multiple examples of the test interface are used during acquisition of the stress test data.

6. The computer system of claim 1, wherein the method further comprises storing eye distribution data acquired from multiple computer systems in a database, wherein the eye distribution data from multiple computer systems is used to compare to the set of predetermined criteria.

7. The computer system of claim 1, wherein the method further comprises replacing the interface settings with the updated interface settings.

8. The computer system of claim 1, wherein the method further comprises distributing the updated settings to other computer systems.

9. The computer system of claim 8, wherein the method further comprises determining a hardware configuration of the computer system; and wherein the updated settings are distributed with the hardware configuration.

10. The computer system of claim 1, wherein there are multiple interfaces.

11. The computer system of claim 1, wherein the method further comprises detecting a hardware change of the computer system using the comparison between the eye distribution data and the set of predetermined criteria, wherein the set of updated interface settings is generated in accordance with the hardware change.

12. The computer system of claim 1, wherein the interface is any one of the following: an elastic interface bus, a high speed bus, elastic interface, FireWire, USB, SATA, eSATA Mainframe I/O channel, Infiniband, ExpressCard, PCI, PCI-X, and PCI Express.

13. The computer system of claim 1, wherein the set of interface settings are updated by selecting a predetermined hardware configuration.

14. A computer program product comprising:
a non-transitory computer readable storage medium readable by a processor and storing instructions for execution by the processor for performing a method comprising:
monitoring communications traffic on at least one interface of the processor, the at least one interface to communicate with an electronic component, and wherein the at least one interface has a set of interface settings, the monitoring comprising monitoring the communications traffic for a predetermined time or execution of instructions causes the processor to monitor the communications traffic when a predetermined traffic criterion is satisfied;
storing eye distribution data acquired during the monitoring of the communications traffic in a database;
comparing the eye distribution data to a set of predetermined criteria; and
generating a set of updated interface settings if the eye distribution does not satisfy the set of predetermined criteria.

15. The computer program product of claim 14, wherein the method further comprises:
defining a set of test interface settings of a test interface to match the set of interface settings;
acquiring stress test eye distribution data from the test interface;
comparing the stress test eye distribution data to the set of predetermined criteria;
recalculating the set of test interface settings if the stress test eye distribution data does not satisfy the set of predetermined criteria; and
using the set of test interface settings as the set of updated interface settings if the test eye distribution satisfies the set of predetermined criteria.

16. The computer program product of claim 14, wherein the method further comprises storing eye distribution data acquired from multiple computer systems in a database, wherein the eye distribution data from multiple computer systems is used to compare to the set of predetermined criteria.

17. The computer program product of claim 14, wherein the method further comprises detecting a hardware change of a computer system comprising the at least one interface, the detecting using the comparison between the eye distribution data and the set of predetermined criteria, wherein the set of updated interface settings is generated in accordance with the hardware change.

18. A method comprising:
monitoring communications traffic on at least one interface of a processor, the at least one interface to communicate with an electronic component, and wherein the at least one interface has a set of interface settings, the monitoring comprising monitoring the communications traffic for a predetermined time or execution of instructions causes the processor to monitor the communications traffic when a predetermined traffic criterion is satisfied;
storing eye distribution data acquired during the monitoring of the communications traffic in a database;
comparing the eye distribution data to a set of predetermined criteria; and
generating a set of updated interface settings based on the eye distribution not satisfying the set of predetermined criteria.

19. The method of claim 18, further comprising storing eye distribution data acquired from multiple computer systems in a database, wherein the eye distribution data from multiple computer systems is used to compare to the set of predetermined criteria.

20. The method of claim 18, further comprising detecting a hardware change of a computer system comprising the at least one interface, the detecting using the comparison between the eye distribution data and the set of predetermined criteria, wherein the set of updated interface settings is generated in accordance with the hardware change.

* * * * *